United States Patent
Connelly et al.

(10) Patent No.: US 11,716,602 B2
(45) Date of Patent: Aug. 1, 2023

(54) LOW ENERGY NETWORK

(71) Applicant: Comcast Cable Communications, LLC, Philadelphia, PA (US)

(72) Inventors: Michael Patrick Connelly, Malvern, PA (US); John Bradford Hart, Philadelphia, PA (US); Theodore Balan Cyril, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 16/384,658

(22) Filed: Apr. 15, 2019

(65) Prior Publication Data
US 2020/0015053 A1 Jan. 9, 2020

Related U.S. Application Data

(63) Continuation of application No. 14/525,907, filed on Oct. 28, 2014, now Pat. No. 10,321,259.

(51) Int. Cl.
| | | |
|---|---|---|
| *H04L 12/28* | (2006.01) |
| *H04W 4/80* | (2018.01) |
| *H04W 4/02* | (2018.01) |
| *H04W 52/02* | (2009.01) |
| *H04L 67/306* | (2022.01) |
| *H04W 4/021* | (2018.01) |

(Continued)

(52) U.S. Cl.
CPC ............. *H04W 4/80* (2018.02); *H04L 67/306* (2013.01); *H04W 4/021* (2013.01); *H04W 4/023* (2013.01); *H04W 4/21* (2018.02); *H04W 52/0203* (2013.01); *H04W 52/0212* (2013.01); *Y02D 30/70* (2020.08)

(58) Field of Classification Search
CPC .. G06F 1/3296; H04L 12/2803; H04W 52/00; H04W 52/02; H04W 52/0206; H04W 52/0212; H04W 52/0216; H04W 52/0225; H04W 52/0229; H04W 52/0235; H04W 68/02; H04W 74/02; H04W 74/04; H04W 74/006; H04W 76/048; H04W 74/0816; H04W 84/12; H04W 4/021; H04W 4/023; H04W 4/80; Y02B 60/50
USPC ........................................ 370/252, 329, 386
See application file for complete search history.

(56) References Cited

U.S. PATENT DOCUMENTS 9,426,615 B2 * 8/2016 Vigier ..................... H04W 4/80
9,613,639 B2 * 4/2017 Adachi ............. H04M 1/72433
(Continued)

FOREIGN PATENT DOCUMENTS

| CA | 2910447 | 4/2016 |
| EP | 3016450 | 5/2016 |
| WO | WO-2013/163326 A1 | 10/2013 |

OTHER PUBLICATIONS

European Search Report and Written Opinion dated Dec. 23, 2015 by the European Patent Office for EP Application No. 15191589.9, filed on Oct. 27, 2015 and published as EP 3016450 on May 4, 2016 (Applicant—Comcast Cable Communications, LLC) (9 Pages).

*Primary Examiner* — John Pezzlo
(74) *Attorney, Agent, or Firm* — Ballard Spahr LLP

(57) ABSTRACT

Methods and systems are disclosed relating to low energy communication devices. A device may be configured as a low energy central device that is associated with a particular location within a premises. Information may be received from a peripheral device when the peripheral device is within a threshold proximity of the low energy central device.

26 Claims, 6 Drawing Sheets

(51) Int. Cl.
  *H04W 4/21*    (2018.01)
  *H04J 1/16*    (2006.01)

(56) References Cited

U.S. PATENT DOCUMENTS

| | | | |
|---|---|---|---|
| 10,062,073 B2* | 8/2018 | Baldie | G06Q 20/327 |
| 10,212,545 B2* | 2/2019 | Choi | H04W 4/023 |
| 10,217,151 B1* | 2/2019 | Greiner | H04W 4/80 |
| 10,321,259 B2 | 6/2019 | Connelly et al. | |
| 2011/0252130 A1 | 10/2011 | Karaoguz | |
| 2012/0100869 A1 | 4/2012 | Liang et al. | |
| 2013/0091209 A1 | 4/2013 | Bennett et al. | |
| 2013/0102283 A1 | 4/2013 | Lau et al. | |
| 2013/0297422 A1* | 11/2013 | Hunter | H04W 4/023 |
| | | | 705/14.58 |
| 2014/0280985 A1 | 9/2014 | Maguire et al. | |
| 2015/0079942 A1* | 3/2015 | Kostka | G06Q 30/0267 |
| | | | 455/411 |
| 2015/0382140 A1* | 12/2015 | Cho | G01S 5/0036 |
| | | | 455/457 |
| 2016/0119742 A1 | 4/2016 | Connelly et al. | |
| 2017/0098042 A1* | 4/2017 | Darby | G16H 70/00 |
| 2018/0176360 A1* | 6/2018 | Selim | G06F 21/6218 |
| 2018/0213361 A1* | 7/2018 | Venkat | H04W 4/029 |

\* cited by examiner

LOW ENERGY NETWORK

CROSS REFERENCE TO RELATED PATENT APPLICATION

This application is a continuation of U.S. application Ser. No. 14/525,907 filed Oct. 28, 2014, which is herein incorporated by reference in its entirety.

BACKGROUND

Power consumption is an important consideration when designing hardware and software for portable electronic devices, such as mobile telephones. For example, Bluetooth® Low Energy (BLE) is now part of the Bluetooth® Specification and provides significant benefits with regards to power consumption compared to previous versions of the Bluetooth® Specification, and other communication and signaling specifications. However, configurations of low power consumption devices and resultant use applications need further development to leverage the advantages offered low energy signaling devices. These and other shortcomings are addressed by the present disclosure.

SUMMARY

It is to be understood that both the following general description and the following detailed description are exemplary and explanatory only and are not restrictive, as claimed. Provided are methods and systems for configuring and using low energy devices, such as Bluetooth® Low Energy (BLE) devices, or other low energy communication devices. In an aspect, one or more devices can be configured as central devices ("centrals") to receive information from one or more peripherals. As an example, the centrals can be mobile or stationary. The centrals can be in communication with other computing devices (e.g., devices in another network such as a cloud computing network) to facilitate additional processing of information received by the centrals. When the centrals are stationary, locations of the centrals can be known. As such, information received by the stationary centrals can be processed based on the known or determined location of the centrals. Similarly, if a plurality of centrals have known locations, a network of known centrals can be used to track user devices, sensors, and other peripherals. Peripherals can be devices that communicate information such as broadcast advertisements, location information, network information, and the like. In an aspect, peripherals can communicate information using low energy protocols.

In one aspect, a plurality of stationary centrals can be provisioned. Such a provisioning can facilitate a network of known centrals for collecting and processing information. As an example, each of the plurality of the stationary centrals can be associated (mapped) with a respective location. First user information can be received from a mobile peripheral when the mobile peripheral is within a threshold proximity of detection by a first central of the plurality of centrals. Second user information can be received from the mobile peripheral when the mobile peripheral is within a threshold proximity of detection by a second central of the plurality of centrals. A user profile can be generated based on the first user information and the second user information.

In an aspect, an identifier of a peripheral device can be detected and received by a service provider when the peripheral device is within a threshold proximity of detection by a first central device. The identifier can be, for example, a media access control (MAC) address. The service provider can associate first user information obtained from the peripheral device with the identifier while the peripheral device is within the threshold proximity of the first central device. The service provider can then determine the peripheral device is within a threshold proximity of detection by a second central device based on the identifier. The second central device can detect and communicate the identifier to the service provider where the service provider can make a comparison to a plurality of identifiers stored in a database to determine whether any of the first user information is associated with the identifier. The service provider can generate an event through the second central device or through the peripheral device which can act as a third central device. The event can be based on at least the first user information associated with the identifier.

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems.

DETAILED DESCRIPTION

Figure 1A:
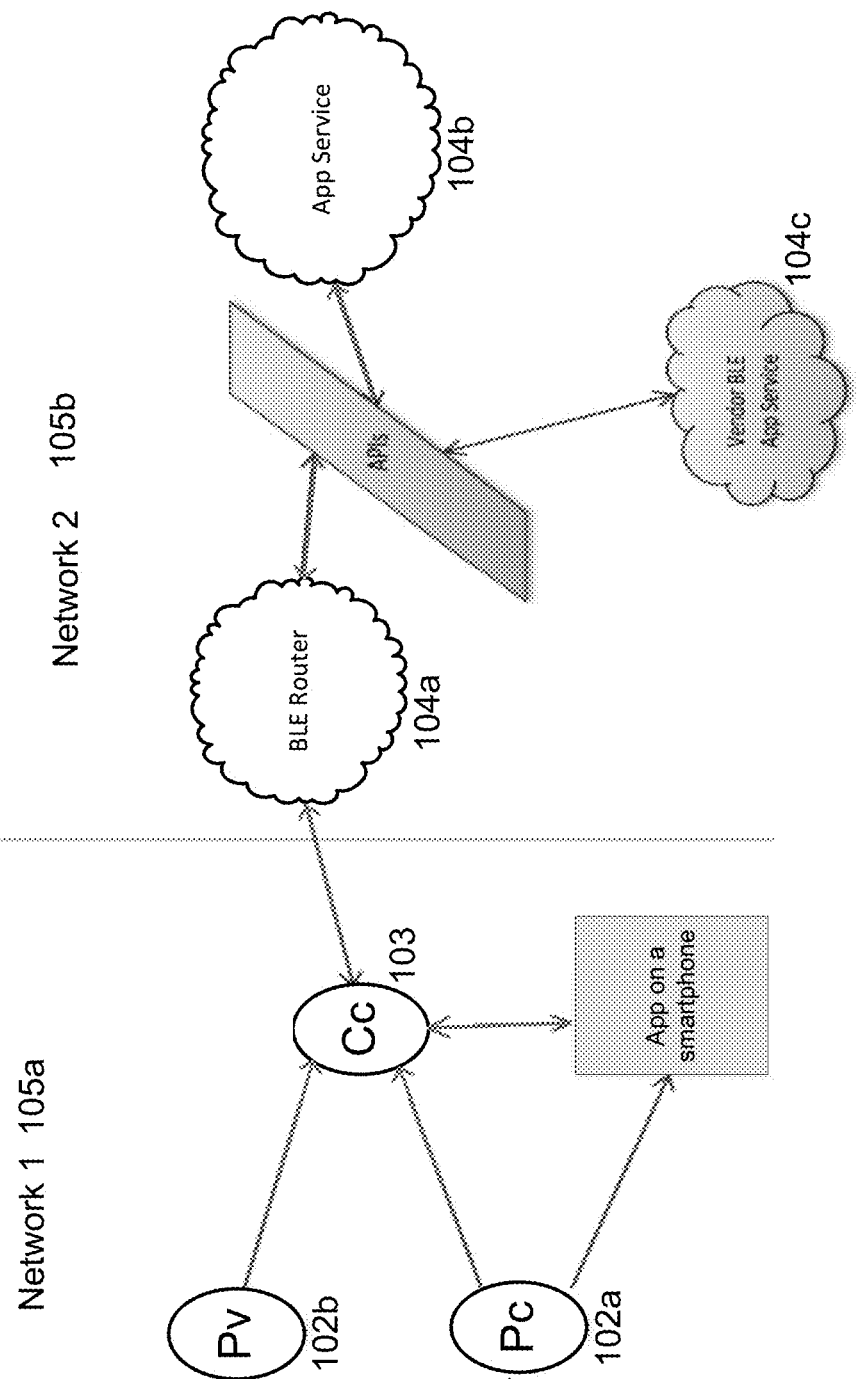
FIG. 1A is a block diagram of an exemplary system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers, or steps. "Exemplary" means "an example of" and is not intended to convey an indication of a preferred or ideal embodiment. "Such as" is not used in a restrictive sense, but for explanatory purposes.

Throughout the description and claims of this specification, the word "stationary" and variations of the word, can mean staying in a particular position for a prolonged period of time. A "stationary" device can be associated with the particular location.

Throughout the description and claims of this specification, the words "migrant" and "mobile" and variations of the words, can mean not "stationary." However it is specifically contemplated that "migrant" and "mobile" can include aspects that may be temporarily stationary. A "migrant" device and/or a "mobile" device can be a device that is not associated with a particular location.

Throughout the description and claims of this specification, the word "peripheral" and variations of the word, can be used to describe a device that broadcasts information (data). For example, a "peripheral" can broadcast advertisements, location information, network information, and the like. A "peripheral" can have data that is needed by other devices.

Throughout the description and claims of this specification, the word "central" and variations of the word, can be used to describe a device that receives information (data) broadcast from a peripheral. In an aspect, a "central" can attempt to connect to a peripheral to further communicate with the peripheral in response to receiving information broadcast from the peripheral. The central can use the data from the peripheral to accomplish a task. A device can serve as a central, a peripheral, or both, depending on a role needed for a particular implementation.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed, it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions, and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Provided are methods and systems for configuring and using low energy devices, such as Bluetooth® Low Energy (BLE) devices. BLE is a protocol that allows for long-term operation of Bluetooth® devices in low-volume data transmission. BLE can enable smaller form factors, better power optimization, and power cells that last for years on a single charge. BLE can function by transmitting brief bursts of low-bitrate data. BLE devices can operate for significantly longer periods of time with the same total power usage by drastically reducing the time spent at peak power consumption. The central-peripheral relationship described throughout the application can be accomplished using the BLE protocol. As one of ordinary skill in the art will appreciate, the central-peripheral relationship can be applied to other low energy protocols such as near field communication (NFC), infrared data association (IrDA), ANT, Zigbee, and the like. In some aspects, a low energy device can be characterized as using less than about 200 microwatts per bit of data transmission, having a maximum current draw of less than about 50 milliamps, and/or less than about 0.2 milliwatts of power usage. Other low energy devices are specifically contemplated.

As used herein, "macro-location" and variations thereof, can be used to describe a range in which a person or thing is located. For example, a Wi-Fi access point may be used to determine a device's macro-location; if the device is connected to the Wi-Fi access point, then the device can be said to be in the Wi-Fi access point's range or "macro-location."

As used herein, "micro-location" and variations thereof, can be used to describe a range in which a person or thing is located, and is relatively more precise than a "macro-location." For example, a first low energy device such as a first BLE-enabled device can determine a second low energy device such as a second BLE-enabled device's micro-location; if the first BLE-enabled device is able to communicate to a second BLE-enabled device through the BLE protocol, then the first BLE-enabled device can be said to be in the second BLE-enabled device's range or "micro-location."

FIG. 1A is a block diagram of an exemplary system. In an aspect, a user or provider, such as a service provider, can position a plurality of peripherals Pc 102a throughout a premises such as a house, office, indoor or outdoor location or area such as a service area, a public facility such as a park or library, a business, or another user location, and the like. In another aspect, another user, such as a vendor or partner of the service provider, can deploy a plurality of peripherals Pv 102b throughout the premises. As an example, the plurality of peripherals 102a, 102b can comprise sensors such as temperature sensors, proximity sensors, user recognition sensors, humidity sensors, thermostats, motion sensors, contact sensors, and the like. In an aspect, the peripherals 102a, 102b (or a combination of multiple sensors) can be configured to determine (e.g., capture, retrieve, sense, measure, detect, extract, or the like) information relating to one or more users. As an example, the peripherals 102a, 102b can be configured to determine the presence of one or more users within a field of operation of the peripherals 102a, 102b. As a further example, the peripherals 102a, 102b can be configured to determine a user state, such as behavior, biometrics, movement, physical and/or chemical characteristics, location, reaction, and other characteristics relating to one or more users. Other characteristics, identifiers, and features can be detected and/or monitored by the peripherals 102a, 102b such as gestures, sounds (e.g., voice, laughter), and environmental conditions (e.g., temperature, time of day, date, lighting, and the like).

In an aspect, the peripherals 102a, 102b can comprise one or more of a camera, stereoscopic camera, wide-angle camera, visual sensor, thermal sensor, infrared sensor, biometric sensor, user tracking device, RF sensor, and/or any other device for determining a user state or condition. In an aspect, the peripherals 102a, 102b can be configured for one or more of facial recognition, gesture recognition, body heat analysis, behavioral analysis, eye tracking, head tracking, biometric analysis and/or other means of determining a user characteristic and/or a change in a user characteristic. As an example, the peripherals 102a, 102b can comprise software, hardware, algorithms, processor executable instructions, and the like to enable the peripherals 102a, 102b to process, route, and/or broadcast any data captured or retrieved by the peripherals 102a, 102b. As a further example, the peripherals 102a, 102b can transmit data captured or retrieved thereby to a device or system in communication with the peripherals 102a, 102b.

In another aspect, peripherals 102a, 102b can comprise user devices such as smartphones, tablets, mobile phones, personal data assistants, and the like. Peripherals can act as information gatherers that transmit status information to a central (e.g., central 103). As an example, a thermostat can gather temperature information. An application installed on a smartphone can determine a subscriber's presence in the house and can transmit presence information to the central. In an aspect, each peripheral can be associated with an identifier for distinguishing the peripheral from other peripherals. In another aspect, groupings of peripherals can share an identifier.

In an aspect, the user or service provider (e.g., a data or content service provider, a network access provider, a data gathering, processing and/or reporting service, and the like) can also position one or more centrals Cc (e.g., central 103) at specific areas at the premises to provide sufficient coverage (e.g., to receive broadcast information from one or more peripherals within range). In an aspect, one or more centrals 103 can act as a hub to one or more peripherals 102a, 102b. In an aspect, a central can be configured to connect with a number of peripherals 102a, 102b. Centrals Cc 103 can be configured to display, route, process, and/or store gathered data. The centrals Cc 103 can collect data from the plurality of peripherals such as Pc 102a and Pv 102b in a first network 105a. One or more centrals 103 can transmit the gathered data over a second network 105b (e.g., a wireless and/or wired IP network, local area network, wide area network, cloud) to a computing device or a network device such as a BLE router 104a, which can be an example of a low energy device. In an aspect, the BLE router 104a can comprise a network router with low energy functionality (e.g., BLE) in addition to higher energy functionality (e.g., Wi-Fi). As an example, the network device can forward the data to a respective service center (e.g., service provider application service center 104b, vendor service center 104c, etc.) based on a variety of factors, including, for example, peripheral identities.

In an aspect, the disclosed methods and systems can enable one or more centrals 103 to have control of the information being gathered and/or exchanged throughout the premises or multiple premises. Thus, a service provider, for example, can be configured to discover all data traffic or a portion of data traffic from a user's or subscriber's home based on at least the data gathered by the plurality of peripherals 102a, 102b (e.g., vendor devices, partner devices, third party migrant devices, etc.). In some aspects, users may be provided with controls over what types and rates of data are discoverable.

In another aspect, third parties to the user and service provider, such as service partners and vendors of the service provider, do not need to deploy separate centrals at the service subscriber's premises. Enhanced services can be provided when accessing an ecosystem comprising a vendor's peripherals such as Pv 102b and/or service provider's peripherals such as Pc 102a. As an example, a service provider can leverage the service provider's one or more centrals and use peripherals to provide a security service. As another example, a vendor can leverage the service provider's one or more centrals and use peripherals to provide a lighting service. For example, the vendor can offer lighting elements that each comprise peripherals, wherein the peripherals can use one or more centrals of the service provider as a gateway. When the peripherals and centrals communicate via the BLE protocol, the service provider can abstract the BLE communications and provide APIs to its partners and vendors.

In another aspect, the disclosed methods and systems can provide centralized control of peripherals 102a, 102b at the premises. Users such as subscribers can access status information of the peripherals 102a, 102b at the premises while the user is located locally or remotely from the premises. The subscribers can also track migrant users at the premises. For example, migrant users can move from place to place within a premises or move from premises to premises. An application installed on the peripherals 102a, 102b and/or the centrals 103 can allow a service provider to execute rules specific to the subscriber. A rule can be any condition that triggers an event. For example, a rule can cause adjustment of the temperature in a particular room based on readings from peripherals placed inside the room. In an example, a stationary peripheral can detect the temperature of the room, such as a thermostat. A mobile peripheral which moves with a person, such as a smartphone acting as a peripheral, can broadcast identification information. A stationary central can match the temperature of a room to a preferred temperature based on the current temperature and received identification information. In another example, a rule can cause an opening and/or unlocking of a door based on detection of a particular peripheral approaching the door. In yet another example, a rule can cause an alert to be sound if a peripheral attached to a pet's collar is detected in a particular area.

In an aspect, the disclosed methods and systems can be used in a home automation system. The service provider can enhance home automation services with the knowledge of the subscriber's micro-location obtained using peripherals within the house. In an aspect, a peripheral can identify the location of a subscriber, for example, a peripheral can indicate which room the subscriber is in, where in the room the subscriber is located, devices that are proximate to the user, and the like. Therefore, the service provider can intelligently provide services to the user. For example, the service provider can configure advertising and promotional content provided to the user's mobile device, so that a particular product advertised or a particular product subject to a deal offered is advertised or offered at a particular time when the device is proximate to an object, as determined by a peripheral and/or central proximate to the object. For example, peripherals embedded in or proximate to a refrigerator can detect a refrigerator door open and a user device proximate to the refrigerator; in response to the detected information, the service provider can cause advertising or deals related to refrigerated goods to be displayed at the user device. In another example, peripherals and/or devices controlled by peripherals, such as lights, can be controlled in a particular room based on the location of the user. Since a central can be connected to peripherals (e.g., user devices, vendor devices, partner devices, etc.) in a house, the service provider can provide centralized control of in-home devices. The service provider can also propose recommendations to the subscriber about security and/or efficient power and/or energy utilization in the home.

In an aspect, the central can detect all peripherals that enter the house. A peripheral can advertise information, including the existence of the peripheral. The central can observe the advertised information from all of the peripherals in a house and learn about the peripherals from the observed information. In an aspect, the central can build a profile for each of the peripherals.

In an aspect, the disclosed methods and systems can provide enhanced services. A service provider can partner with other vendors to enhance both in-home and out-of-home services. When the peripherals and centrals communicate via a low energy protocol, such as the BLE protocol, the service provider of a central can abstract the low energy communications and provide APIs to associated vendor partner services and/or applications for a peripheral. This can allow vendor partners to focus on business logic and analytics and leave the low energy communications and other access technologies to the service provider.

In an aspect, the disclosed methods and systems can be used when a subscriber is away from the home. For example, a service provider can identify when a specific subscriber visits another subscribers' homes and can provide "away from home" services. For example, when subscriber A visits subscriber B's house, by identifying subscriber A's peripheral with a central in subscriber B's house, the service provider can broadcast subscriber A's content channel line-up, video-on-demand offerings, network DVR content, and the like at subscriber B's house. In another example, when subscriber A visits subscriber B's house, in response to identifying subscriber A's peripheral with the central in subscriber B's house, the service provider can configure subscriber B's home Wi-Fi network to broadcast to subscriber A's peripheral the SSID and any other security related information/configurations that subscriber A has configured at subscriber A's home.

In an aspect, the disclosed methods and system can provide intelligent services based on holistic analytics. A service provider can have a holistic understanding by combining what is learned about a subscriber's behavior in-home with that of the subscriber's behavior outside of the home through the use of a subscriber's peripheral and a service provider's central. For example, a subscriber's macro-location and behavior outside the home when the subscriber has a peripheral can facilitate targeted advertising to the subscriber when the subscriber is at home or away by use of a service provider's central. As another example, a service provider can also influence a subscriber's shopping preferences by providing recommendations based on what goods/services are needed at home, combined with an identification of the particular mall and/or store the subscriber is visiting with the subscriber's peripheral. As another example, if a subscriber with a peripheral enters a shoe section of a store that has a central, but does not make a purchase, a service provider can deliver shoe ads to the subscriber when the subscriber watches television at home. In a further example, the service provider can then determine whether the shoe ad was successful by determining if the user purchases the shoes that were the subject of the ad the next time the user visits a shoe store or makes a shoe purchase online. Note, the tracking of purchases will be further described below. As another example, a service provider can identify guests to a subscriber's home (e.g., migrant users), by use of the guests' peripherals and the subscriber's central, who are service subscribers and can upsell services to the migrant users.

In an aspect, a role of a first device acting as a peripheral device and second device acting central device can be flipped such that the first device can perform functions of a central device and the second device can perform functions of a peripheral device. In an aspect, the first device and the second device can act as a central device and a peripheral device at the same time. For example, a user device such as a smartphone can act as a central device by collecting data from a biometric sensor acting as a peripheral device. The smartphone can also act as a peripheral device at the same time or at a later time by connecting with a computer acting as a central device and uploading the data collected from the biometric sensor to the computer. The computer can also act as a peripheral device to the smartphone acting as a central device by communicating data back to the smartphone.

In an aspect, having a first device that can act as both a peripheral device and a central device can increase the number of devices that communicate with a central device acting as a hub. For example, if the central device has a three bit address space then the central device can communicate with seven peripheral devices each having one of seven of peripheral identities/addresses while one address is for the central device acting as the hub. Having one of the seven peripheral devices, such as the first device, acting as both a peripheral device and a central device allows the first device to communicate with seven other peripheral devices and receive data from the seven other peripheral devices as a central device. Then as a peripheral device of the central device, the first device can communicate the data received from the seven other peripheral devices to the central device. In an aspect, the peripheral addresses of the seven other peripheral devices can be identified by the peripheral identity/address of the first device. Furthermore, the first device acting as both a peripheral device and a central device can expand coverage of a low energy device network by linking peripheral devices to the central device that are in a range of coverage of the first device but not the central device.

In another aspect, a user device can be used as a central. The methods and systems can be used for micro-location based services. In an example a role of a mobile peripheral device can be flipped such that the mobile peripheral device is now a mobile central device. In the example, a plurality of peripherals can be positioned around an amusement park and configured to broadcast location information. A user device such as smartphone can capture the location information from the peripherals. A service (e.g., cloud service) can analyze the captured information and provide relevant location-based services. For example, efficient queue management can be provided. Specifically, a plurality of peripherals can be positioned at a queue entrance and a queue exit of a ride. As a visitor approaches a ride, a park application installed on the visitor's smartphone can collect the visitor's information (such as location and time) via a peripheral broadcasting at the queue entrance. Similarly, the application can collect the same information from a peripheral at the queue exit. Accordingly, the park application can transmit the collected information (e.g., location, entry time, exit time) to a park application server (e.g., a cloud service). Thus, the park application server can calculate the ride's queue wait time for a particular visitor. The park application service can also calculate average waiting time over a sample of visitors, thereby estimating a ride's current queue wait time. A visitor can also be notified of current wait times for rides in his vicinity.

In another example, the disclosed methods and systems can be used to find a friend. For example, a visitor can add other visitors' profiles (e.g., name, telephone number, email address) to a list of friends. When the visitor and the friend move around the amusement park, their respective micro-locations can be sent to the park application server. A visitor can access a map of the park with his friends' locations indicated through the park application installed on the visitor's user device (e.g., smartphone).

In another example, the disclosed methods and systems can provide a visitor guide based on a vacation planner. For example, a visitor can plan his day either via a park website or via the park application. The visitor can be notified through the park application of an optimal itinerary incorporating his preferences. An itinerary can be generated based on current park conditions and can be updated as queue conditions change. As the visitor wanders through the park, the cloud server can use the visitor's micro-location to note which rides the visitor has visited. The cloud server can send notifications to the visitor reminding him of the rides he has yet to visit. These notifications can be sent at a set time, on a periodic basis, or in response to a particular event, such as a ride's current estimated queue wait time falling below a certain threshold.

In another example, the disclosed methods and systems can enable payment options and/or upgrade options. For example, the park application can enable convenient payment options. Payment for park tickets can be made through the park application prior to a visitor visiting the park. Similarly, payments for shops and restaurants can be purchased through the park application. The park application can also be used to upsell packages or offer an upgrade, such as an annual pass upgrade.

In another example, the disclosed methods and systems can enable digital signage around the park to give visitors and pass holders notifications. Display screens can be mounted at key areas around the park to display notifications to visitors. Both general notifications and personalized notifications can be displayed based on who is standing in front of the screen. As an example, general notifications can comprise a show that is about to start, winners of contests, and the like. As another example, personalized notifications can comprise a map of the park with highlighting of the places that the visitor has planned to visit, and the like. As such, a visitor can move around the park without need to constantly look at his user device (e.g., smartphone).

In another example, the disclosed methods and systems can enable application of loyalty points and/or deals. For example, the park can maintain a database comprising visitor profiles which can comprise the visitors' stated preferences, observed behavior, and the like. In an aspect, observed behavior can comprise park attendance, visits to particular attractions, and the like. In a further aspect, attractions can comprise park rides, restaurants, stores, and the like. A visitor can be awarded loyalty points based on both stated preferences and observed behavior.

In another example, the disclosed methods and systems can be used with a program to assist with the dining and shopping experience of a visitor to the park. For example, a park application can detect whether a visitor has been in any park shops or eating facilities. As another example, if a visitor has not been observed in a shop or eating facility, the park application can send the visitor a personalized promotion. In an aspect, the location of the visitor to the park can be determined using a combination of micro-location and macro-location. In an aspect, micro-location using BLE can be combined with macro-location or zone-based geo-fencing using Wi-Fi, or other technology. In an aspect, a Wi-Fi access point can detect a mobile device and provide a notification to the mobile device suggesting a user of the mobile device enable Bluetooth communications. In another aspect, a Wi-Fi access point can detect a mobile device and provide an option to the mobile device to run an application to scan for peripherals and/or centrals. In another aspect, the park application can determine what macro-locations of the park the visitor visited by which Wi-Fi access points were connected to by the visitor's mobile device. In an aspect, within the determined macro-locations, the park can determine which micro-locations, including individual shops and restaurants, the visitor visited. In an aspect, the park can offer the visitor a coupon to a shop in response to determining that the visitor visited a macro-location of the park where the shop is located, but did not visit the shop.

Figure 1B:
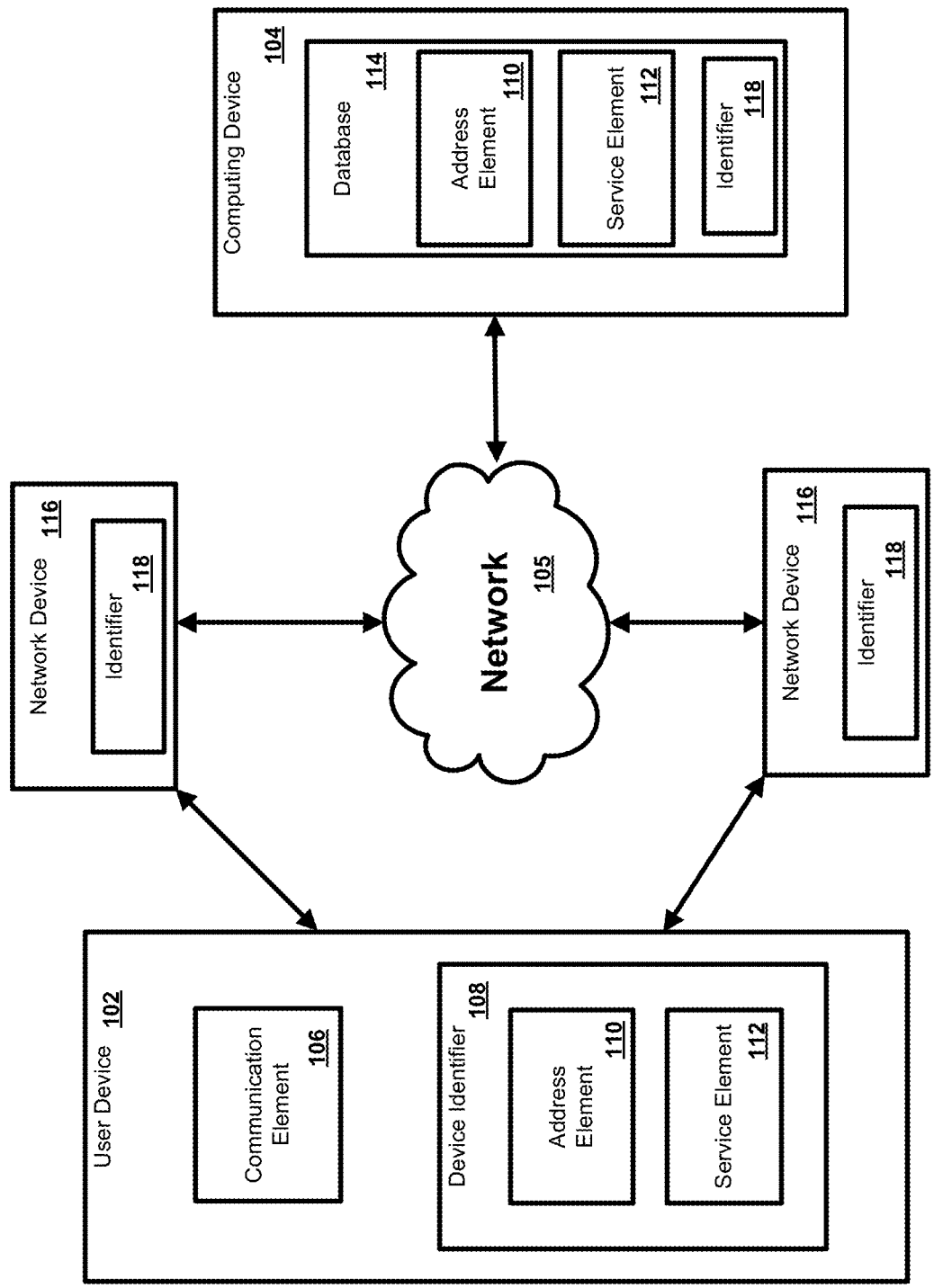
FIG. 1B is a block diagram of an exemplary system.

In one aspect of the disclosure, a system can be configured to provide services, such as network-related services, to a user device. FIG. 1B illustrates various aspects of an exemplary environment in which the present methods and systems can operate. The present disclosure is relevant to systems and methods for providing services to a device, for example, a user device 102 such as a smartphone, computer, tablet, mobile device, communications terminal, or the like. In an aspect, one or more network devices 116 can be configured to provide various services to one or more devices, such as devices located at or near a premises. In another aspect, the network devices 116 can be configured to recognize an authoritative device for the premises and/or a particular service or services available at the premises. As an example, an authoritative device can be configured to govern or enable connectivity to a network 105, provide address and/or configuration services, and/or provide naming or service discovery services for a premises, or a combination thereof. In an aspect, the network 105 can be the Internet or any other remote resource. In an aspect, address and/or configuration services can comprise DHCP or the like. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The networks and systems can comprise a user device 102 in communication with a computing device 104, such as a server, for example. The computing device 104 can be disposed locally or remotely relative to the user device 102. As an example, the user device 102 and the computing device 104 can be in communication via a private and/or public network 105 such as the Internet or a local area network. Other forms of communication can be used such as wired and/or wireless telecommunication channels, for example.

In an aspect, the user device 102 can be an electronic device such as a computer, a smartphone, a laptop, a tablet, a set-top box, a display device, or other device capable of communicating with the computing device 104. As an example, the user device 102 can be configured as a central or a peripheral. As an example, the user device 102 can comprise a communication element 106 for providing an interface to a user to interact with the user device 102 and/or the computing device 104. The communication element 106 can be any interface for presenting and/or receiving information to/from the user, such as user feedback. An example interface may be communication interface such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can comprise or provide an internet protocol address, a network address, a media access control (MAC) address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network 105.

In an aspect, the service element 112 can comprise an identification of a service provider and/or manufacturer associated with the user device 102 and/or with the class of user device 102. The class of the user device 102 can be related to a type of device, capability of device, type of service being provided, and/or a level of service (e.g., business class, service tier, service package, etc.). As an example, the service element 112 can comprise information relating to or provided by a communication service provider (e.g., Internet service provider) that is providing or enabling data flow such as communication services to the user device 102. As a further example, the service element 112 can comprise information relating to a preferred service provider for one or more particular services relating to the user device 102. In an aspect, the address element 110 can be used to identify or retrieve data from the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can be a server associated with a service provider. As an example, the computing device 104 can communicate with the user device 102 for providing data and/or services. As an example, the computing device 104 can provide services such as network (e.g., Internet) connectivity, network printing, media management (e.g., media server), content services, streaming services, broadband services, or other network-related services. In an aspect, the computing device 104 can allow the user device 102 to interact with remote resources such as data, devices, and files. As an example, the computing device 104 can be configured as a central. As another example, the computing device 104 can be configured as a peripheral. As a further example, the computing device 104 can be configured as both a central and a peripheral. As yet another example, the computing device 104 can be configured as a component of a cloud network, such as a server or a router.

In an aspect, the computing device 104 can manage the communication between the user device 102 and a database 114 for sending and receiving data therebetween. As an example, the database 114 can store a plurality of files (e.g., web pages), user identifiers or records, or other information. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, one or more network devices 116 can be in communication with a network such as network 105. As an example, one or more of the network devices 116 can facilitate the connection of a device, such as user device 102, to the network 105. As a further example, one or more of the network devices 116 can be configured as a wireless access point (WAP). In an aspect, one or more network devices 116 can be configured to allow one or more wireless devices to connect to a wired and/or wireless network using Wi-Fi, Bluetooth, BLE, or any desired method or standard. As an example, one or more of the network devices 116 can be configured as a peripheral or central.

In an aspect, the network devices 116 can be configured as a local area network (LAN). As an example, one or more network devices 116 can comprise a dual band wireless access point. As an example, the network devices 116 can be configured with a first service set identifier (SSID) (e.g., associated with a user network or private network) to function as a local network for a particular user or set of users. As a further example, the network devices 116 can be configured with a second service set identifier (SSID) (e.g., associated with a public/community network or a hidden network) to function as a secondary network or redundant network for connected communication devices.

In an aspect, one or more network devices 116 can comprise an identifier 118. As an example, one or more identifiers 118 can be or relate to an Internet Protocol (IP) Address IPV4/IPV6 or a media access control address (MAC address) or the like. As a further example, one or more identifiers 118 can be a unique identifier for facilitating communications on a physical network segment. In an aspect, each of the network devices 116 can comprise a distinct identifier 118. As an example, the identifiers 118 can be associated with a physical location of the network devices 116.

Figure 2:
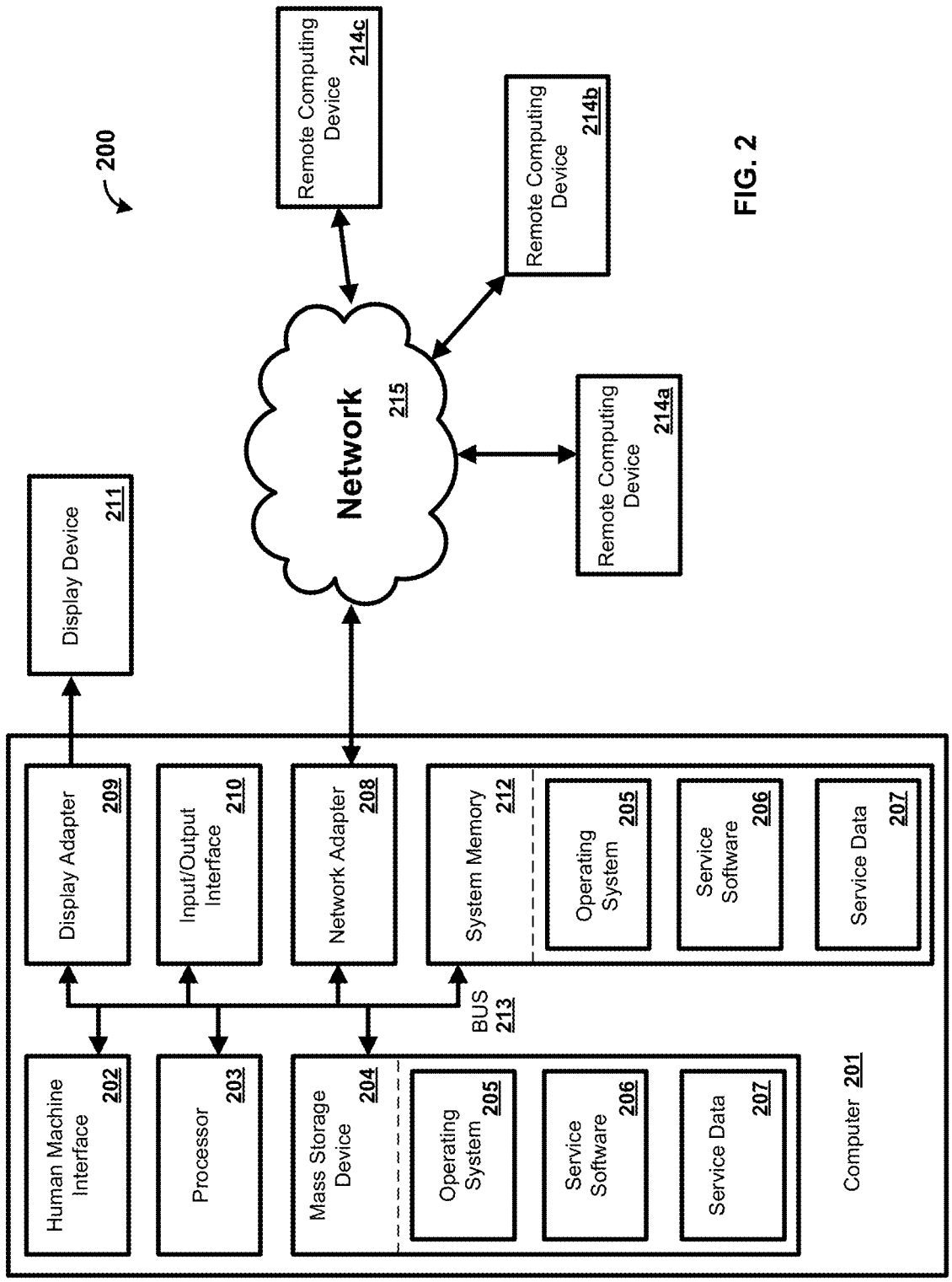
FIG. 2 is a block diagram illustrating an example computing device.

In an exemplary aspect, the methods and systems can be implemented on a computer 201 as illustrated in FIG. 2 and described below. By way of example, a user device 102 and/or a computing device 104 of FIG. 1B can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set-top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 201. The components of the computer 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, service software 206, service data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computer 201 typically comprises a variety of computer readable media. Exemplary readable media can be any available media that is accessible by the computer 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as service data 207 and/or program modules such as operating system 205 and service software 206 that are immediately accessible to and/or are presently operated on by the processing unit 203.

In another aspect, the computer 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computer 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and service software 206. Each of the operating system 205 and service software 206 (or some combination thereof) can comprise elements of the programming and the service software 206. Service data 207 can also be stored on the mass storage device 204. Service data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computer 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computer 201 via Input/Output Interface 210. Any step and/or result of the methods can be output in any form to an output device. Such output can be any form of visual representation, including, but not limited to, textual, graphical, animation, audio, tactile, and the like. The display 211 and computer 201 can be part of one device, or separate devices.

The computer 201 can operate in a networked environment using logical connections to one or more remote computing devices 214a,b,c. By way of example, a remote computing device can be a personal computer, portable computer, smartphone, a server, a router, a network computer, a peer device or other common network node, and so on. Logical connections between the computer 201 and a remote computing device 214a,b,c can be made via a network 215, such as a local area network (LAN) and/or a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of service software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Figure 3:
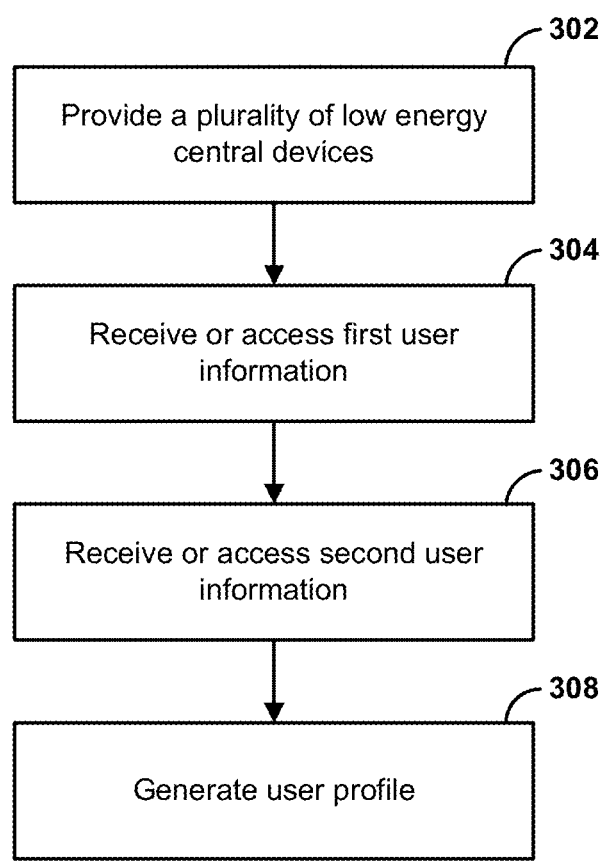
FIG. 3 is a flowchart illustrating an example method.

An example method is shown in FIG. 3. In step 302, a plurality of low energy centrals can be provided. One or more centrals can comprise a network gateway, a set-top box, or both. The plurality of low energy centrals can be provided by provisioning the plurality of low energy centrals to communicate through a low energy protocol to one or more peripherals. In an aspect, one or more of the plurality of low energy centrals can be stationary. In an aspect, when provisioning, each of the one or more of the centrals can be associated with a respective location. As a further example, each of the one or more centrals can be associated with a respective location within the same premises. In an aspect, the one or more centrals can be provisioned to be associated with a service provider. In an aspect, the service provider can provision or associate with a plurality of centrals distributed throughout a service area. The centrals can create a mesh network of known points in the service area. In an aspect, the centrals can be provisioned or arranged so that the network can cover an entire premises. In an aspect, the centrals can be provisioned or arranged so that the network can cover a portion of interest of a premises. In an aspect, the centrals of the network can discover all peripherals within an area, including peripherals deployed/provisioned by the service provider, peripherals deployed/provisioned by partners of the service provider, and peripherals without any relationship with the service provider.

In step 304, first user information can be received or accessed from a mobile peripheral. In an aspect, the first user information can be received via one or more centrals. In another aspect, the first user information can be received when the mobile peripheral is within a threshold proximity of a first central of the one or more centrals. As an example, the threshold proximity can be based upon a beacon range of the mobile peripheral. As a further example, the threshold proximity can be based upon a beacon range of the first central. In an aspect, the mobile peripheral can comprise a wearable device, a smartphone, or a combination thereof.

In step 306, second user information can be received or accessed from the mobile peripheral. In an aspect, the second user information can be received via one or more centrals. In another aspect, the second user information can be received when the mobile peripheral is within a threshold proximity of a second central. As an example, the threshold proximity can be based upon a beacon range of the mobile peripheral. As a further example, the threshold proximity can be based upon a beacon range of the second central. In an aspect, the mobile peripheral can comprise a wearable device, a smartphone, or a combination thereof.

In step 308, a user profile can be generated based on the first user information and the second user information. In an aspect, one or more of the first user information and the second user information can comprise location information relating to a user. In another aspect, the user profile can comprise information relating to a user behavior, user habit, or both. In an aspect, the user profile can comprise information linking user behavior or habit to a location or an item associated with a location. For example, the first user information can comprise information indicating that the user lingered in an area with shoes displayed for five minutes. In the example, the second user information can comprise information indicating that the user lingered in a second area with shoes displayed for five minutes. In the example, the user profile can indicate that the user is likely interested in shoes.

Figure 4:
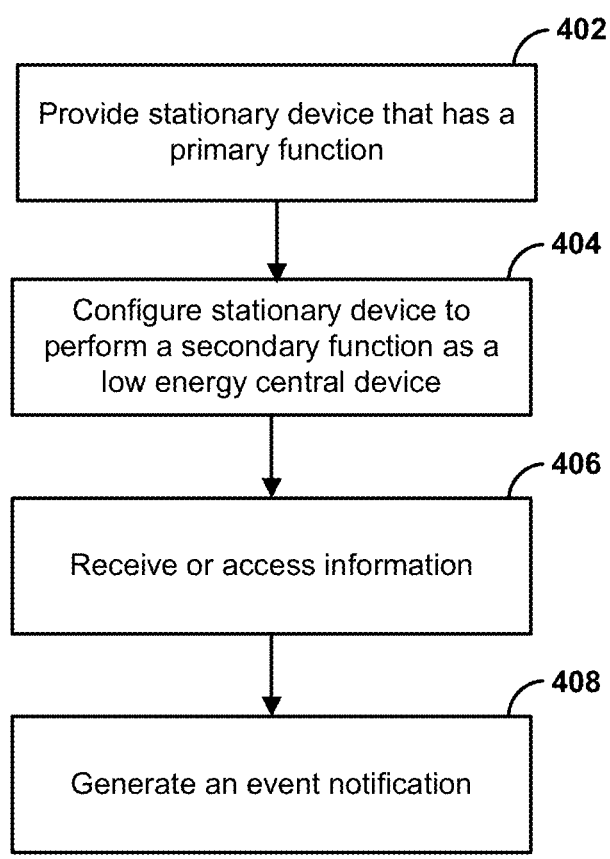
FIG. 4 is a flowchart illustrating another example method.

An example method is shown in FIG. 4. In step 402, a stationary device can be provided that can provide a primary function. A primary function can be a basic function that a device is intended to provide based on a particular situation. For example, the stationary device can comprise a network gateway, a set-top box, or both. The primary function of a set-top box, for example, can be providing television programming or content if the particular situation calls for consumption of content. Alternatively, the primary function of the set-top box could be provided network connectivity if the particular situation calls for network connectivity functionality rather than consumption of content. The primary function of a network gateway can be providing internet service.

In step 404, a stationary device can be configured to provide a secondary function as a low energy central device. A secondary function can be a function that is not the intended purpose of a device based on the particular situation but a function that supports or is collateral to the primary function. A secondary function can be, for example, the stationary device acting as a central device or a peripheral device using a low energy protocol and communicating data according to a low energy protocol. For example, when the stationary device is a set-top box the primary function can be receiving and providing television programming while the secondary function can be communicating with a mobile device of a user via a low energy protocol and using the data from the mobile device to adjust the primary function such as television programming. In an aspect, the stationary device can be associated with a particular location within a premises. As an example, the particular location in the premises can comprise a room, a position relative to a dividing wall, or a combination thereof.

In step 406, information can be received or accessed from a peripheral. The peripheral can comprise a wearable device, a smartphone, a sensor, or a combination thereof. In an aspect, the information can be received via the stationary device through the secondary function. As an example, the information can be received when the peripheral is within a threshold proximity of the stationary device. As a further example, the threshold proximity can be based upon a beacon range of the peripheral. As another example, the threshold proximity can be based upon a beacon range of the stationary device. The peripheral (or a combination of multiple sensors) can be configured to determine (e.g., capture, retrieve, sense, measure, detect, extract, or the like) information relating to one or more users. As an example, the peripheral can be configured to determine the presence of one or more users within a threshold proximity. As a further example, the peripheral can be configured to determine a user state, such as behavior, biometrics, movement, physical and/or chemical characteristics, location, reaction, and other characteristics relating to one or more users. Other characteristics, identifiers, and features can be detected and/or monitored by the peripheral, such as gestures, sounds (e.g., voice, laughter), and environmental conditions (e.g., temperature, time of day, date, lighting, and the like).

In step 408, an event notification can be generated based on the received information. In an aspect, the event notification can relate to a state or change in state of the peripheral or user. As an example, the event notification can relate to the presence of one or more users within a range of the peripheral. As a further example, the event notification can relate to a user state, such as behavior, biometrics, movement, physical and/or chemical characteristics, location, reaction, and other characteristics relating to one or more users. Other characteristics, identifiers, and features can relate to the event notification, such as gestures, sounds (e.g., voice, laughter), and environmental conditions (e.g., temperature, time of day, date, lighting, and the like). The event notification can comprise a message, signal, change in operation of a device, logged information, or the like. For example, in an application that provides lighting for a room, an event can comprise a user entering the room. In another example, in an application for regulating the temperature of a room, an event can comprise the room temperature dropping below a temperature preference of the users in the room.

Figure 5:
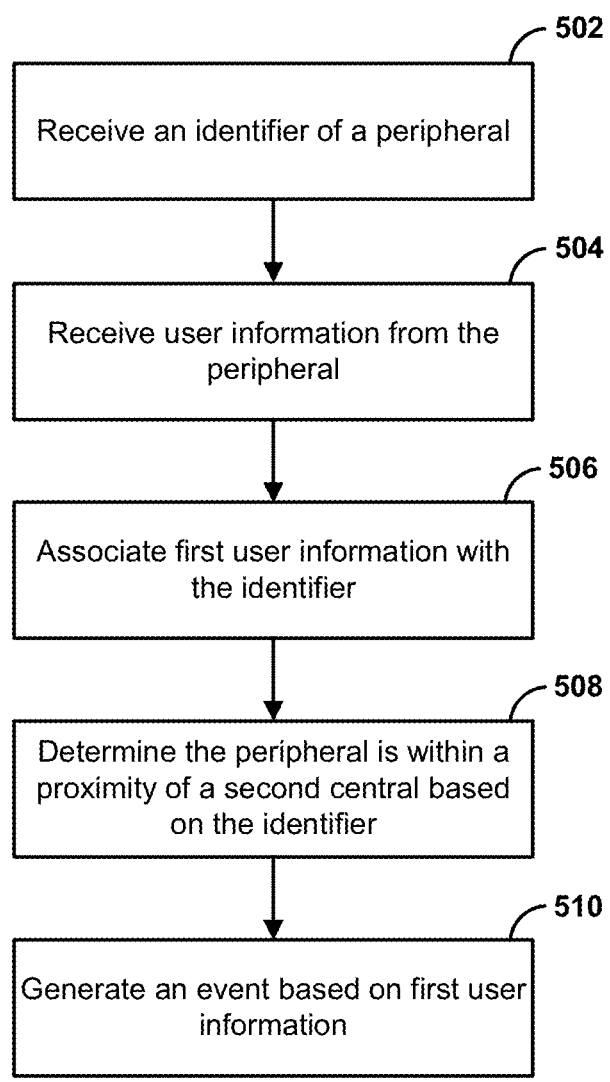
FIG. 5 is a flowchart illustrating another example method.

An example method is shown in FIG. 5. In step 502, a service provider can receive an identifier of a peripheral device when the peripheral device is within a threshold proximity of detection by a first central device. In an aspect the identifier of the peripheral device can be any identifier, token, character, string, or the like, for differentiating one user or peripheral device (e.g., user device from another user or user device). In a further aspect, the identifier can identify a user or peripheral device as belonging to a particular class of users or peripheral devices. As a further example, the identifier of the peripheral device can comprise information relating to the peripheral device such as a manufacturer, a model or type of device, a service provider associated with the peripheral device, a state of the peripheral device, a locator, and/or a label or classifier. Other information can be represented by the identifier.

In an aspect, the identifier can comprise an address element (peripheral identity) and a service element. In an aspect, the address element can comprise or provide an internet protocol address, a network address, a media access control (MAC) address, an Internet address, or the like. As an example, the address element can be relied upon to establish a communication session between the peripheral device and the first central device or other central devices and/or networks. As a further example, the address element can be used as an identifier or locator of the peripheral device. In an aspect, the address element can be persistent for a particular network. In an aspect, the identifier can be used by other peripheral devices to identify the peripheral device when the peripheral device is also acting as a central device.

In step 504, the service provider can receive first user information from the peripheral device while the peripheral device is in the threshold proximity of the first central device. As an example, the threshold proximity can be based upon a beacon range of the peripheral device. As another example, the threshold proximity can be based upon a beacon range of the first central device. The peripheral device (or a combination of multiple sensors) can be configured to determine (e.g., capture, retrieve, sense, measure, detect, extract, or the like) the first user information relating to one or more users. As an example, the peripheral device can be configured to determine the presence of one or more users within a threshold proximity. As a further example, the peripheral device can be configured to determine a user state, such as behavior, biometrics, movement, physical and/or chemical characteristics, location, reaction, and other characteristics relating to one or more users. Other characteristics, identifiers, and features can be detected and/or monitored by the peripheral device, such as gestures, sounds (e.g., voice, laughter), and environmental conditions (e.g., temperature, time of day, date, lighting, and the like). The service provider can associate the first user information with the identifier of the peripheral device and store the first user information for later use.

In step 506, the service provider can associate the first user information with the identifier of the peripheral device while within a threshold proximity of the first central device. In an aspect, the service provider can store the identifier or locate the identifier in a database of subscribers and store the first user information with the identifier.

In step 508, the service provider can determine the peripheral device is within a threshold proximity of a second central device based on the identifier. The second central device can be a device that performs a primary function such as a set-box, a gateway, and the like which can perform functions such as television services, Internet services, or both. The service provider can compare the identifier to other identifiers it has stored in a database of subscribers. When the service provider locates a match of the identifier, the service provider can use the first user information associated with the identifier to generate an event.

In step 510, an event can be generated (e.g., by the service provider) based on the first user information associated with the identifier. In an aspect, the event can also be based on the primary function of the second central device. In an aspect, the event can be generated through the second central device. In an aspect, the event can be generated through the peripheral device. The peripheral device can act as a third central device (i.e., the peripheral device can flip roles from a peripheral device to a central device or act as both). As an example, when a user of the peripheral device returns home, the first user information gathered from a business premises having a central device, such as the first central device, can be used to customize a user experience in the home. As an example, a user's habits within a particular business can translate to events such as automated service provisions in the home. In the example, as the user moves through the business, one or more central devices of the business can track the user's location and communicate this information to the service provider as the first user information. The service provider can associate the first user information with the identifier of the peripheral device. In the example, the service provider can determine in which areas of the business the user lingered and, with this first user information, deduce which products are of interest to the user. Later, when the user returns home and the user's peripheral device's identifier is detected by a set-top box configured as a central device such as the second central device, the service provider can then generate events such as offer targeted advertisement to the user through television and Internet advertising based on the first user information of the tracked movements and/or lingering in the business.

In an aspect, a service provider can provision or associate with a plurality of centrals distributed throughout a service area. The centrals can create a mesh network of known points in the service area. Further, the centrals can receive information from any number of peripherals distributed throughout the service area. As such, the service provider can operate a configuration manager in a cloud service to control an enumeration of the devices and beacons being transmitted and received on a service area basis. In an aspect, the centrals can be arranged so that the network can cover an entire premises. In an aspect, the centrals can be arranged so that the network can cover a portion of interest of a premises. In an aspect, the centrals of the network can discover all peripherals within an area, including peripherals deployed by the service provider, peripherals deployed by partners of the service provider, and peripherals without any relationship with the service provider. In an aspect, the centrals of the network can communicate the discovery of a peripheral with each other. In an aspect, the centrals of the network can communicate the discovery of a peripheral with a cloud service. In an aspect, centrals of the network can provide a level of redundancy in the coverage of the network. In an aspect, in response to detecting a peripheral deployed by the service provider or a peripheral deployed by a partner of the service provider, a central of the network can serve as an entry point to the premises and do one or more of: send a request to connect, inquire for more information, direct the peripheral to perform some action, or any combination of the foregoing. In an aspect, the cloud service of the network can provide APIs to applications of the service provider and/or applications of the partners of the service provider; thereby abstracting the details of the underlying low energy (e.g. BLE, NFC) technology. In an aspect, the service provider and/or partners of the service provider can use APIs provided by the cloud service of the network to direct commands to the peripherals, without having detailed knowledge of the low energy technology. In an aspect, the network can allow the service provider to learn the presence of peripherals that enter the premises; the service provider can correlate the peripherals in the premises with users, context, and/or environment of the premises and take some action.

In another aspect, since peripherals can transmit (e.g., broadcast) information continuously, a receiving device such as a smartphone configured as a central can discover any number of peripherals. The received signal strength can indicate information relating to proximity of the central (and user) from any number of peripherals. This information can be used to define a micro-location/position, wherein relative position to multiple known peripherals can facilitate the determination of a precise position of the central (and user).

In an aspect, a service provider can provision one or more peripherals to a business premises. Further, the service provider can provide a back office computing system (e.g., cloud) for managing the provisioned peripherals. As an example, the service provider can also provision other communication networks, such as a Wi-Fi network, to the same business premises. As such, when a user enters the business premises, the user's mobile device can be recognized by an identifier (e.g., a MAC address known to the service provider because of the user's subscription to a Wi-Fi service). The service provider can then determine user location, user behavior, user habits, and the like, based on the user's mobile device's interaction with one or more of the Wi-Fi network and a low energy protocol network such as a BLE network. User interaction can be seamless to the user. No action is necessary by the user outside of enabling Wi-Fi and BLE capabilities on the mobile device. The mobile device can automatically broadcast information and/or receive broadcast information without being engaged by the user. Furthermore, when a user returns home, the information gathered from the business premises can be used to customize a user experience in the home. As an example, a user's habits within a particular business can translate to automated service provisions in the home. As an example, a user can visit a business that uses Wi-Fi access points (for macro-location detection) and centrals (for micro-location detection). In the example, the user can have a Wi-Fi enabled, low energy protocol compatible mobile device. In the example, the user's mobile device can automatically connect to the Wi-Fi access point provided by the business. In the example, the user's mobile device scans for peripherals. In the example, as the user moves through the business, the Wi-Fi access points and centrals of the business can track the user's location and communicate this information to the service provider. In the example, the service provider can determine which areas of the business the user lingered in and, with this information, deduce which products are of interest to the user. Later, when the user returns home, the service provider can then offer targeted advertisement to the user through television and Internet advertising based on the tracked movements and/or lingering in the business.

In an aspect, an auto-present feature can be enabled using low energy protocol according to the systems and methods of the present disclosure. For example, a user device (e.g., smartphone, bracelet, wearable technology, etc.) can be configured as a peripheral and carried by a user. As the user enters a venue that requires permission, the peripheral can transmit the access information to an access control system at the venue. As another example, access to the venue can be granted or denied based upon the receipt of proper access information from the peripheral. As a further aspect, a supplemental application (e.g., independent of the low energy communications) can display more detailed information (e.g., picture) relating to the user associated with the access information, which can allow a secondary verification.

In an aspect, the flow of traffic, such as pedestrians, shoppers, vehicles, etc., can be controlled based on information received from low energy devices in accordance with the systems and methods of the present disclosure. As an example, a user can be routed to a particular destination based upon the known traffic conditions and patterns gathered from other peripherals and centrals in a given area. As a further example, a vendor can determine the location of any number of users (e.g., patrons, shoppers, attendees). A child wearing a peripheral can be located by a management system that can search for the broadcast information of the peripheral. As such, an application executing at a vendor location or on another user device can receive the location information from the management system, thereby locating the child. Likewise, a visitor guide relating to a particular venue or location can dynamically generate an itinerary based on analytics. The visitor guide can adjust event/location recommendations based on analytics.

In an aspect, user habits can be analyzed to determine a happiness index based on ordinary and out-of-ordinary behavior. In response to the determination of the happiness index, messages such as characters (based on a user's interests) can be transmitted to a particular user. As an example, if a child is having a low happiness index and likes princesses, the system can facilitate manual or automatic transmission of a princess character to the child. As another example, if a child is having a low happiness index and likes princesses, the system can cause an actress portraying a princess to be dispatched to the child.

In an aspect, pricing can be based on an experience rating. For example, if a user is in queue for a threshold period of time (e.g., 45 minutes), the application can transmit an offer to upgrade to a VIP experience that could place the user in the front of the line.

In an aspect, centrals can be configured to provide personalized experiences to users. A user device can be configured to provide information to the centrals and the centrals can process the received information to customize an output. For example, a native language for a user or a group of users can be received from a peripheral associated with the user or the group of users and a dynamic, personalized offer can be presented via a nearby digital advertisement to the user and/or the group of users. As a new user approaches the central, the advertisement can be updated for the new user.

In an aspect, a national (or any area) footprint of stationary centrals (e.g., set-top boxes, gateways, etc.) can facilitate a robust tracking network. As an example, one or more centrals can be associated with a location. As a further example, one or more centrals can be configured to receive information (e.g., via peripheral broadcast) from one or more users. Additional information about the peripheral, such as a MAC address, can be used to identify a particular user. As such, user behavior throughout the national footprint can be tracked and a profile can be created representing such behavior.

In an aspect, one or more centrals can be stationary and one or more peripherals can be mobile. As an example, additional processing resources can be available to the centrals and/or peripherals via a network (e.g., in a cloud service). Using such a configuration, various devices can be configured as one or more of a central and/or a peripheral. As an example, a BLE radio can be added to a conventional power strip, wherein devices in communication with the power strip can be monitored. As a further example, a peripheral can be configured as part of a remote control, wherein the location of the remote control can be broadcast. A wearable device such as glasses or a watch can be configured as a peripheral sensor. In an aspect, the wearable device can cooperate with applications such as FitBit®. Further, centrals can be associated (e.g., mapped) to particular areas of a premises to allow for a more granular location tracking of peripherals by the centrals than would otherwise be available.

In an aspect, a loyalty program can be contained within a store's stationary centrals or in a cloud service in communication with the store's stationary centrals and can interpret a broadcasted low energy protocol signal from a user device within the proximity of the centrals.

In an aspect, set-top box (STB) parental controls can be dependent on low energy devices (e.g., if a parent's phone (peripheral) is in front of the STB (central), then R-rated movies can be shown; otherwise they cannot; presence of a child's BLE device (peripheral) can stop an R-rated movie from playing). A STB acting as a central can determine that a particular user is in front of a STB based on a peripheral device's low energy protocol and automatically log into a profile associated with the user. The STB can also use location and duration to predict whether a user that is determined to not be in front of the STB will be back. For example, the STB may determine that a user that is no longer in front of the STB has only gone to the kitchen and will likely be back, and therefore the STB does not log the user out, even if the user's wife is in front of the STB when the user leaves for the kitchen. However, if, for example, the STB receives information indicating that the user is in front of another STB or has left the premises, then the STB can log the user out and log into the profile of the user's wife. Additional conditions can be applied to the STB. For example, a parent may not let a child watch TV until the child has completed any homework. In this example, the STB can look for proximity and an additional condition, such as approval from the parent.

In an aspect, the systems and methods of the present disclosure facilitate personalized video services using a central and a peripheral, such as individually targeted advertising, wherein an advertisement can be transmitted to a user of a correct demographic, regardless of the channel watched. This allows advertisers to reach the target demographic without relying on the content as a proxy to deliver an advertising message to the correct demographic.

In an aspect, a user can leave a room and go into another room and the system can broadcast what the user was watching from where the user left off in the other room, automatically, based on a location of the user's peripheral. As an example, an individualized commercial can be sent to a user based on a known presence in front of a STB (central). Commercials can continue when a user is not proximate to the STB (e.g., commercials transmitted to a mobile device of the user or a second STB (central) that the user may now be in front of). Notifications relating to a particular product can be sent to the user's peripheral when the user is in the store and in the proximity of the product. The system can track if the user bought the product with a point of sale device or via e-sales of the product.

In an aspect, an enhanced 911 (E-911) system can leverage the disclosed systems and methods. In an aspect, the E-911 system can transmit a location for a low energy device. For any form of messaging, location can be based on a low energy protocol such as the BLE protocol (e.g., fabric of stationary centrals). Such location information can be routed to an application, centralized server, connected user, and/or appropriate personnel, such as a 911 dispatcher. As an example, a user can have a peripheral such as BLE bracelet that emits a location. In another aspect, the BLE bracelet can emit an identification value. A stationary central can receive the BLE broadcasted identification value, and, transmit the location of the stationary central and the received identification value to an application, centralized server, connected user, and/or appropriate personnel, such as a 911 dispatcher.

In an aspect, an application on a user device can detect proximity to a network device, such as a gateway. In an aspect, the gateway can comprise a peripheral. In an aspect, the user device can act as a central and receive information broadcast from the gateway. With the information from the gateway, the user device application can request information from the network, like the SSID and key/password to connect to the gateway.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method comprising:
   receiving, by an application server via a mobile device, first location information and second location information, wherein the first location information comprises a first time and a location associated with a first peripheral device, wherein the second location information comprises a second time and a location associated with a second peripheral device, and wherein the mobile device, the first peripheral device, and the second peripheral device are different devices;
   determining, based on the first location information and the second location information, a first micro-location of a premises associated with the mobile device at the first time and a second micro-location of the premises associated with the mobile device at the second time; and
   causing, based on a quantity of time between the first time and the second time, a notification, associated with the premises, to be provided at the mobile device, wherein the notification comprises information associated with one or more of the first micro-location or the second micro-location.

2. The method of claim 1, wherein the first micro-location comprises the location associated with the first peripheral device and wherein the first location information comprises data broadcast by the first peripheral device via a low energy communication protocol and received by the mobile device.

3. The method of claim 1, wherein the second micro-location comprises the location associated with the second peripheral device and wherein the second location information comprises data broadcast by the second peripheral device via a low energy communication protocol and received by the mobile device.

4. The method of claim 1, wherein the notification associated with the premises is provided at the mobile device via an application executing on the mobile device and wherein the application is associated with the premises.

5. The method of claim 1, wherein the notification comprises information associated with one or more of an attraction at the premises or an event at the premises.

6. The method of claim 1, further comprising:
receiving, via the mobile device, a request to join a network broadcast at the premises, wherein the network is accessible by the mobile device at the first micro-location and the second micro-location.

7. The method of claim 6, wherein the first micro-location and the second micro-location are determined based on a macro-location at the premises associated with the network.

8. A method comprising:
receiving, by an application server via a mobile device, a request to join a network broadcast at a macro-location of a premises;
receiving, from the mobile device via the network, first location information comprising a first time and second location information comprising a second time;
determining a first micro-location of the premises associated with the mobile device at the first time and a second micro-location of the premises associated with the mobile device at the second time based on the macro-location, the first location information, and the second location information; and
causing, based on a quantity of time between the first time and the second time, a notification, associated with the premises, to be provided at the mobile device, wherein the notification comprises information associated with one or more of the first micro-location or the second micro-location.

9. The method of claim 8, wherein the macro-location comprises the first micro-location and the second micro-location.

10. The method of claim 8, wherein the first location information further comprises a location associated with a first peripheral device and wherein the mobile device receives the first location information from the first peripheral device at the first micro-location at the first time.

11. The method of claim 8, wherein the second location information further comprises a location associated with a second peripheral device and wherein the mobile device receives the second location information from the second peripheral device at the second micro-location at the second time.

12. The method of claim 8, wherein the notification comprises information associated with one or more of an attraction at the premises or an event at the premises.

13. The method of claim 8, wherein the notification associated with the premises is provided at the mobile device via an application executing on the mobile device and wherein the application is associated with the premises.

14. A system comprising:
a mobile device configured to:
receive, via a low energy communication protocol, first location information from a first peripheral device, wherein the first location information comprises a first time and a location associated with the first peripheral device; and
receive, via the low energy communication protocol, second location information from a second peripheral device, wherein the second location information comprises a second time and a location associated with the second peripheral device and wherein the mobile device, the first peripheral device, and the second peripheral device are different devices; and
an application server configured to:
receive, via the mobile device, the first location information and the second location information;
determine, based on the first location information and the second location information, a first micro-location of a premises associated with the mobile device at the first time and a second micro-location of the premises associated with the mobile device at the second time; and
cause, based on a quantity of time between the first time and the second time, a notification, associated with the premises, to be provided at the mobile device, wherein the notification comprises information associated with one or more of the first micro-location or the second micro-location.

15. The system of claim 14, wherein the first micro-location comprises the location associated with the first peripheral device and wherein the first location information comprises data broadcast by the first peripheral device via the low energy communication protocol and received by the mobile device.

16. The system of claim 14, wherein the second micro-location comprises the location associated with the second peripheral device and wherein the second location information comprises data broadcast by the second peripheral device via the low energy communication protocol and received by the mobile device.

17. The system of claim 14, wherein the notification associated with the premises is provided at the mobile device via an application executing on the mobile device and wherein the application is associated with the premises.

18. The system of claim 14, wherein the notification comprises information associated with one or more of an attraction at the premises or an event at the premises.

19. The system of claim 14, wherein the application server is further configured to:
receive, via the mobile device, a request to join a network broadcast at the premises, wherein the network is accessible by the mobile device at the first micro-location and the second micro-location.

20. The system of claim 19, wherein the application server is further configured to determine the first micro-location and the second micro-location based on a macro-location at the premises associated with the network.

21. A system comprising:
a mobile device configured to receive, via a low energy communication protocol, first location information comprising a first time and second location information comprising a second time;
and
an application server configured to:
receive, via the mobile device, a request to join a network broadcast at a macro-location of a premises;
receive, via the mobile device, the first location information and the second location information;
determine a first micro-location of the premises associated with the mobile device at the first time and a second micro-location of the premises associated with the mobile device at the second time based on the macro-location, the first location information, and the second location information; and
cause, based on a quantity of time between the first time and the second time, a notification associated with the premises to be provided at the mobile device, wherein the notification comprises information associated with one or more of the first micro-location or the second micro-location.

22. The system of claim 21, wherein the macro-location comprises the first micro-location and the second micro-location.

23. The system of claim 21, wherein the first location information further comprises a location associated with a first peripheral device and wherein the mobile device receives the first location information from the first peripheral device at the first micro-location at the first time.

24. The system of claim 21, wherein the second location information further comprises a location associated with a second peripheral device and wherein the mobile device receives the second location information from the second peripheral device at the second micro-location at the second time.

25. The system of claim 21, wherein the notification associated with the premises is provided at the mobile device via an application executing on the mobile device and wherein the application is associated with the premises.

26. The system of claim 21, wherein the information associated with one or more of the first micro-location or the second micro-location comprises information associated with one or more of an attraction at the premises or an event at the premises.

* * * * *